US008437553B2

(12) United States Patent
Washida

(10) Patent No.: US 8,437,553 B2
(45) Date of Patent: May 7, 2013

(54) IMAGE DETECTION DEVICE AND IMAGE DETECTION METHOD

(75) Inventor: Shinichi Washida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 474 days.

(21) Appl. No.: 12/611,471

(22) Filed: Nov. 3, 2009

(65) Prior Publication Data

US 2010/0046839 A1  Feb. 25, 2010

Related U.S. Application Data

(63) Continuation of application No. PCT/JP2008/066884, filed on Sep. 18, 2008.

(30) Foreign Application Priority Data

Sep. 20, 2007  (JP) .................................. 2007-244101

(51) Int. Cl.
G06K 9/46 (2006.01)
G06K 9/66 (2006.01)

(52) U.S. Cl.
USPC ........... 382/190; 348/148; 382/103; 382/105; 382/298

(58) Field of Classification Search ................. 382/103, 382/190, 298, 105; 348/148
See application file for complete search history.

(56) References Cited

U.S. PATENT DOCUMENTS

| | | | |
|---|---|---|---|
| 6,281,928 B1 * | 8/2001 | Umezaki et al. | 348/148 |
| 6,373,962 B1 * | 4/2002 | Kanade et al. | 382/105 |
| 6,754,369 B1 * | 6/2004 | Sazawa | 382/105 |
| 7,176,959 B2 * | 2/2007 | Sato et al. | 348/148 |
| 8,031,228 B2 * | 10/2011 | Okamoto | 348/169 |
| 8,094,934 B2 * | 1/2012 | Morimitsu | 382/168 |
| 8,121,348 B2 * | 2/2012 | Hayasaka et al. | 382/103 |
| 8,194,998 B2 * | 6/2012 | Saito | 382/274 |
| 2003/0156757 A1 * | 8/2003 | Murakawa et al. | 382/195 |

(Continued)

FOREIGN PATENT DOCUMENTS

| JP | 2002-208009 | 7/2002 |
|---|---|---|
| JP | 2003-36439 | 2/2003 |

(Continued)

OTHER PUBLICATIONS

Office Action which issued on Dec. 12, 2011, in counterpart CN 200880017861.3.

(Continued)

Primary Examiner — Gregory M Desire
(74) Attorney, Agent, or Firm — Fitzpatrick, Cella, Harper & Scinto

(57) ABSTRACT

The present invention provides an image detection device and an image detection method for efficiently detecting a specific image area existing within an image. The image detection device of the present invention first changes a size of an original image using an initial value of a scaling factor (enlargement/reduction ratio) against the original image and detects the specific image (e.g. number plate). Next, the image detection device carries out the change of the original image size and the detection of the specific image repeatedly by changing the scaling factor. Further, an embodiment of the present invention realizes a high speed by repeating the detection while using the enlarged or reduced images, and also realizes the high speed by determining an area where another specific image cannot exist and carrying out the detection efficiently using this information.

33 Claims, 13 Drawing Sheets

U.S. PATENT DOCUMENTS

| | | | |
|---|---|---|---|
| 2004/0234136 A1* | 11/2004 | Zhu et al. | 382/224 |
| 2007/0132788 A1* | 6/2007 | Heo | 345/660 |
| 2010/0046839 A1* | 2/2010 | Washida | 382/190 |
| 2010/0289897 A1* | 11/2010 | Arai | 348/148 |

FOREIGN PATENT DOCUMENTS

| | | |
|---|---|---|
| JP | 2003-036439 A | 2/2003 |
| JP | 2004-334461 | 11/2004 |
| JP | 2006-318341 | 11/2006 |
| JP | 2006-318341 A | 11/2006 |

OTHER PUBLICATIONS

International Preliminary Report on Patentability in PCT/JP2008/066884, along with English-language translation, dated Apr. 1, 2010—17 pages.

* cited by examiner

IMAGE DETECTION DEVICE AND IMAGE DETECTION METHOD

BACKGROUND OF THE INVENTION

1. Field of the Invention

The present invention relates to image detection devices and image detection methods and, in more detail, relates to an image detection device and an image detection method for detecting a specific image area from an image or the like photographed by a digital camera or a video camera.

2. Description of the Related Art

There are a number of image processing systems that provide a detection unit detecting a specific image area of an object or the like, such as a number plate, the format of which is determined in advance to a certain degree regarding a character order. However, in most cases, the condition is determined that the size of the specific image area is inferred to a certain degree or the number of sizes for image areas which can be recognized correctly is one. In other words, when there exists an image area the size of which is different from that of an image area which serves as a base for the above-described inference, it has been difficult to recognize the object correctly.

For a unit to solve these problems, Japanese Patent Laid-Open No. 2004-334461 enables character images of different sizes to be found by dividing an image into strips of various sizes and searching for a character image within the division for each of the various sizes.

That is, Japanese Patent Laid-Open No. 2004-334461 divides an image for which characters) are to be recognized into first division forms (in which the image is divided into partial areas each having an equal first area) in a predetermined direction. At the same time, the image is divided into second division forms (in which the image is divided into partial areas each having an equal second area different from the first area) in a predetermined direction. For example, the first area is set small and the second area is set large, and thereby both large and small characters can be recognized.

SUMMARY OF THE INVENTION

However, according to the technique described in Japanese Patent Laid-Open No. 2004-334461, it is necessary to search for strip images of all sizes which are predicted for the object detection, on the basis of the original image, resulting in a problem of detection speed.

That is, according to Japanese Patent Laid-Open No. 2004-334461, when there are N division forms (N; integer equal to two or larger), it is required to carry out processing relating to the character search on the basis of the original image for each of the N division forms to detect the object from the image, and thereby the detection speed is increased. Further, processing is carried out for each of the N division forms, such as generation of projected data, extraction of a projection section, formation of a character string area, and character recognition, and thereby, a memory for the above processing is necessary for each of the N forms, resulting in an increase in cost.

The present invention has been achieved in view of the above-described problems, and an object thereof is to provide an image detection device and an image detection method capable of efficiently detecting a specific image area which exists in an image.

For achieving the above object, an image detection device according to the present invention is an image detection devise detecting a specific image to be searched for from an image, and includes: a size changing unit changing a size of an original image according to a set scaling factor; a detection unit detecting the specific image to be searched for within a detectable size range of the image detection device from the image, the size of which has been changed by the size changing unit; a change unit changing the scaling factor, and a control unit performing control so as to make the processing of the size changing unit and the processing by the detection unit to be carried out again using the scaling factor changed by the change unit.

According to the present invention, high-speed and correct image recognition processing is made possible.

Further features of the present invention will become apparent from the following description of exemplary embodiments (with reference to the attached drawings).

DESCRIPTION OF THE EMBODIMENTS

Figure 1:
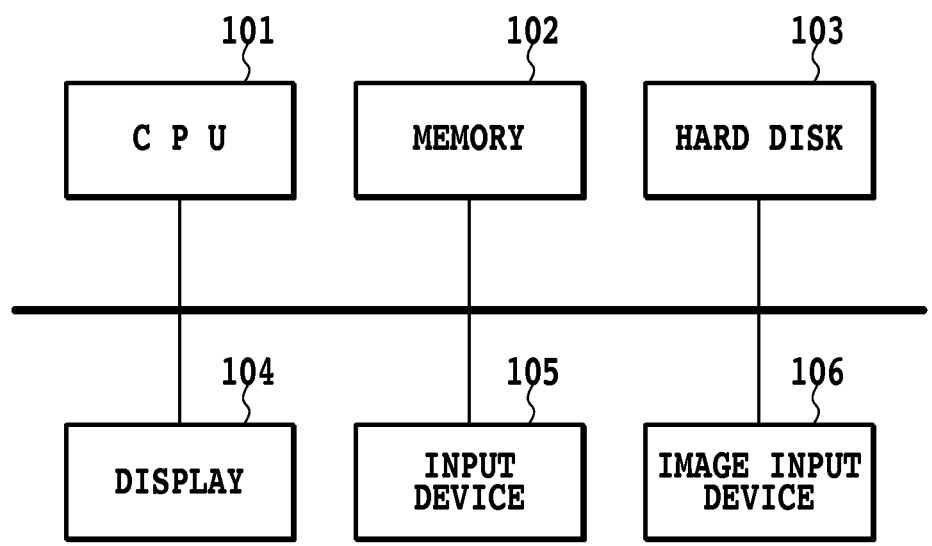
FIG. 1 is a system configuration diagram showing an environment of an embodiment of the present invention.

Embodiments of the present invention will be described below in detail with reference to the drawings. Note that, in the drawings to be described below, those which have the same function are assigned the same symbol and duplicated explanation will be omitted.

An image detection device according to the present invention, when detecting a specific image area to be detected (detection image area), such as a number plate and a face of a person, from an input original image, even if there exist specific images of various sizes, large and small, in the original image, efficiently recognizes the specific images.

Meanwhile, for the image detection device, a size range of the specific image that can be detected by one detection process is set in advance depending on the specification of the device. That is, depending on the specification of the device, the detectable size range of the specific image is defined as a dot range (pixel range). This is because a hardware size tends to increase if the specific images of the various sizes are to be detected by one detection process. However, in the original image to be detected, the sizes of all the specific images do not necessarily fall within the detectable range. Consequently, the present embodiment carries out control so that the sizes of specific image having the size other than the detectable size fall within the detectable size range by executing detection processing after performing reduction processing or enlargement processing on the original image to be detected. Thereby, the sizes of the specific images having the size other than the detectable size also can fall within the detectable size range through the enlargement processing or the reduction processing, and detection and recognition can be carried out.

Note that, preferably, as in an embodiment to be described below, the original image is first subjected to the reduction processing in an initial scaling factor (e.g. reduction into one fourth of the original image) and detection processing of the detection image area (e.g. number plate area) is carried out for the image which has been reduced first. When the image area has been detected by the first detection processing, the part of the area is set to be skipped in the following detection processing. Then, the size is changed by the change of the scaling factor so as to make the image larger than the image which has been reduced first (e.g. reduction to one half of the original image) and the detection processing of the detection image area is carried out for the image having been reduced with the changed scaling factor. Subsequently, by repeating such processing while changing the scaling factor, it becomes possible to detect the detection image areas of various sizes (number plate areas) from the original image. For example, the first detection processing may be carried out using the image of a one-fourth size, the second detection processing may be carried out using the image of a half size, and the third detection processing may be carried out using the image of the original size. Further, the detection processing is carried out in the order from a small image to a larger image and a part of the image area having been detected during the processing is skipped in the following detection processing, and thereby it is possible also to obtain an effect of performing the detection processing in a high speed.

Further, while the initial scaling factor is preferably a scaling factor to provide the reduction processing (e.g. ¼) in the case that the original image has a large size, the detection processing started from the reduced image is considered to be futile in the case of a small original image. In such a case, the detection processing may be started from the image having the same size as that of the original image, or the detection processing may be started from the image having a size enlarged from that of the original image, by using a scaling factor such as one and one and a half for the initial scaling factor. In this case, for example, the first detection processing may be carried out using the image with the scaling factor of one, the second detection processing may be carried out using the image with the scaling factor of one and a half, and the third detection processing may be carried out using the image with the scaling factor of two.

In an embodiment of the present invention, it is possible to increase the detection speed and efficiently detect the detection image area because N division forms are not used as conventionally, when detecting detection image areas of different sizes. Further, because no memory area is necessary for the N division forms, the cost can be reduced.

First Embodiment

A first embodiment will be described below.

FIG. 1 is a block diagram showing a configuration of an image detection device for carrying out the present embodiment. Numeral 101 denotes a CPU that carries out control of the entire present device, data processing, etc. Numeral 102 denotes a memory including a ROM in which programs or the like executed by the CPU 101 to control the device are stored and a RAM used as a work area or the like for carrying out the processing. Numeral 103 denotes an external storage device and numeral 104 denotes a display as a display section for displaying various displays represented by input images, setting states of the image detection device, etc. Numeral 105 denotes an input device, such as a keyboard, a mouse, and various switches, for inputting predetermined instructions, data, etc. and numeral 106 denotes an image input device, such as a digital camera. Note that the image input device 106 may be connected via an interface (e.g. USB) when carrying out image input.

While, in the present embodiment, an image to be detected (original image) can be input to the image detection device via the image input device 106, the present embodiment is not limited to this configuration. The image may be input to the image detection device via a portable medium, such as a magnetic disk and optical disk. Further, the image may be input from another external device, such as a PC, via a network.

Figure 2:
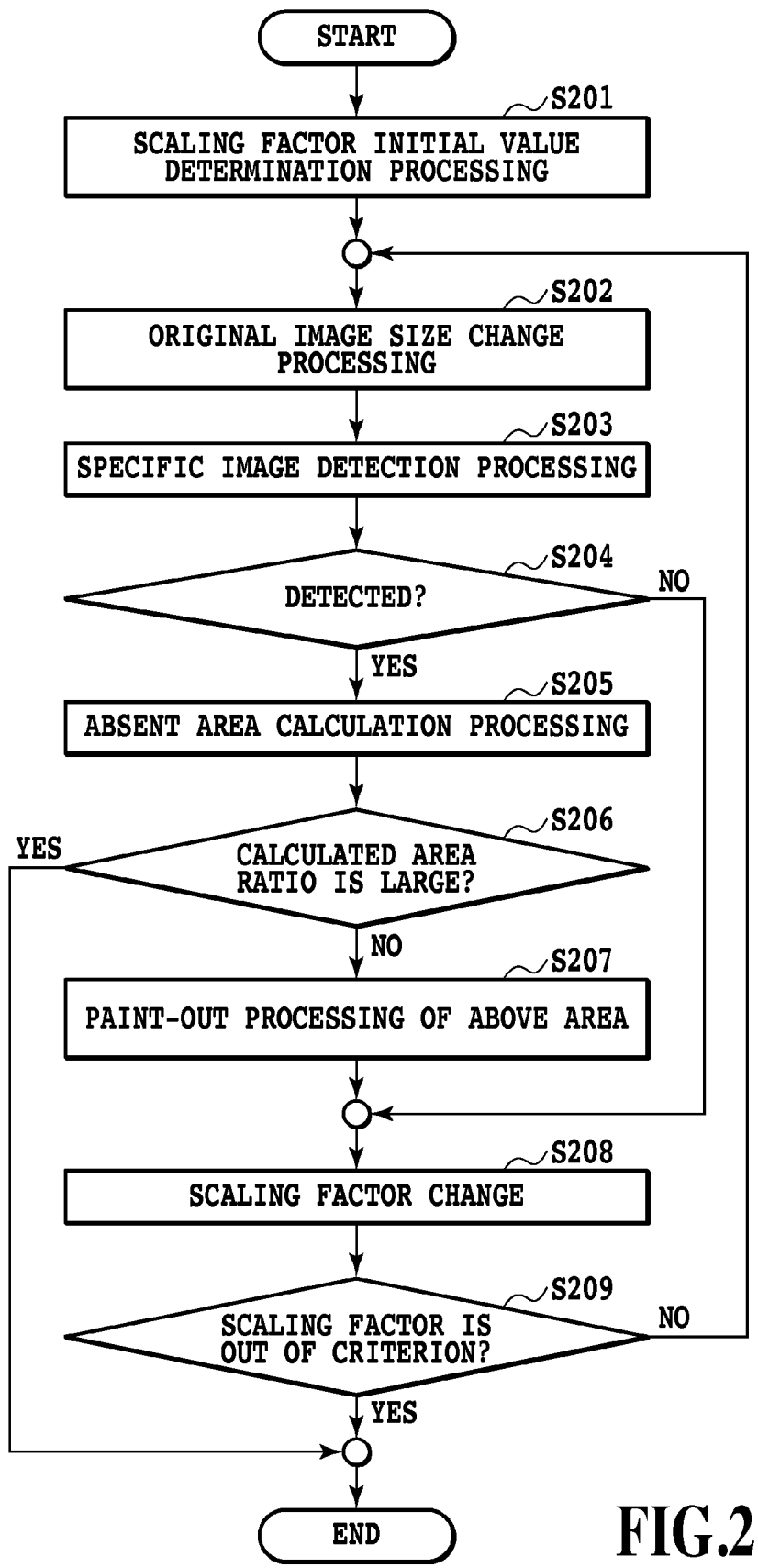
FIG. 2 is a flowchart showing the operation of the entire system in an embodiment of the present invention.

FIG. 2 is a flowchart showing the operation of the entire system in the present embodiment. The CPU 101 reads a program stored in the memory 102 and carries out the following operations according to the flowchart shown in FIG. 2.

Figure 3:
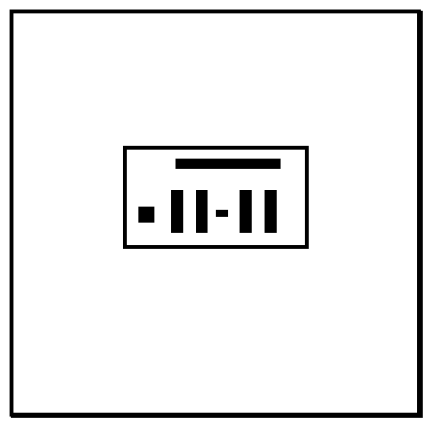
FIG. 3 is a diagram showing an example of a specific image to be searched for in an embodiment of the present invention.

In the present embodiment, there will be described a case in which a specific image to be searched for (detection image area) is a number plate. FIG. 3 is a diagram showing a number plate, which is an example of a specific image to be searched for in the present embodiment. Note that, while the present embodiment describes the case of detecting the number plate having black numbers or characters described on a white ground (specific image) from the original image photographed by a digital camera, the number plate is not limited to such a number plate.

In step S201, the CPU 101 carries out processing to determine a scaling factor (enlargement/reduction ratio) for initially changing the size of an image input by the image input device 106 (also called an original image). That is, the CPU 101 sets an initial value of the scaling factor (enlargement/reduction ratio) for the image to be detected (original image). The size of an input original image is not limited in particular. This enlargement/reduction ratio may be a fixed value, such as 50% of the original image, or a value calculated from the original image size in order to obtain a fixed image size, such as vertical 640 dots by horizontal 480 dots.

In the present embodiment, the setting of the above-described scaling factor (enlargement/reduction ratio) may be done in advance or done according to the information input by a user via the input device 105. In the present embodiment, it is assumed that the scaling factor (enlargement/reduction ratio) is set to 50% in advance.

In step S202, the CPU 101 carries out the processing to change (enlarge or reduce) the size of the original image according to the initial value of the scaling factor (enlargement/reduction ratio) determined in step S201. In addition, when step S202 is entered from step S209 through the loop, the CPU 101 changes the size of the original image according to the scaling factor (enlargement/reduction ratio) changed in step S208. The enlargement/reduction method at this time may be simple multiplication or thinning of the original image, or other publicly known techniques may be used.

Figure 4:
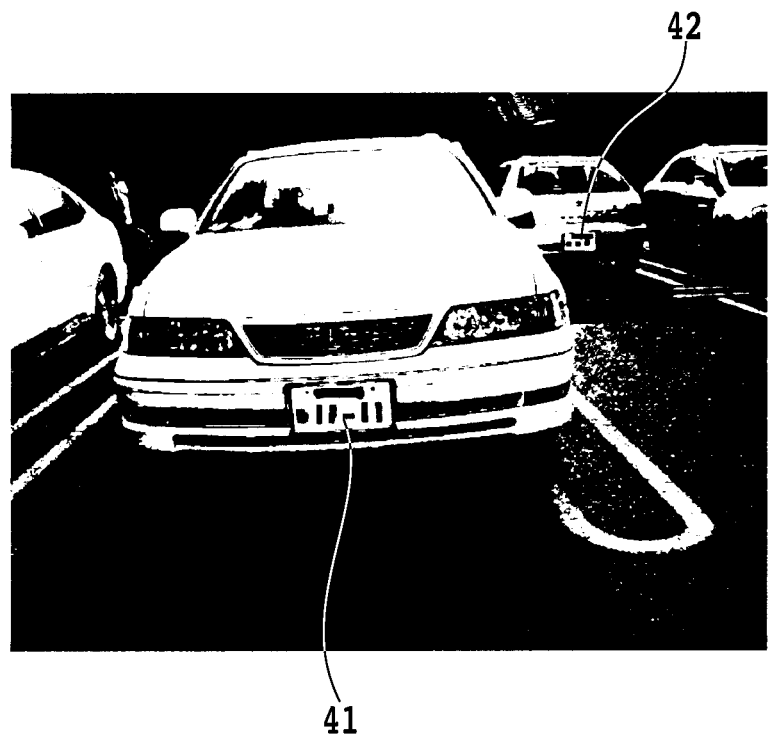
FIG. 4 is a diagram showing an example of an input original image in an embodiment of the present invention.
Figure 5:
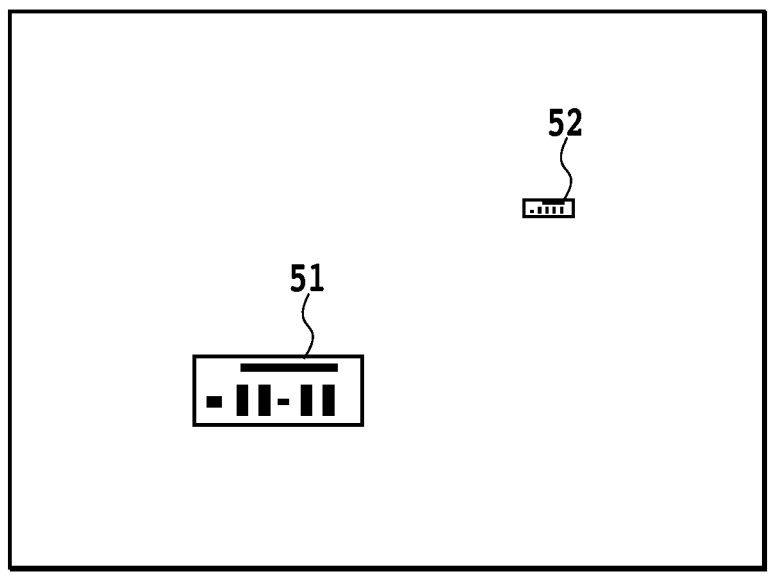
FIG. 5 is a diagram showing only specific images to be searched for in the input original image shown in FIG. 4 in an embodiment of the present invention.

FIG. 4 is an example of an input original image in the present embodiment. In this image, for the specific image to be searched for as shown in FIG. 3, two number plates, large and small number plates (41 and 42), are photographed. The present invention carries out processing for detecting the number plates of various sizes as shown in FIG. 4. FIG. 5 is a diagram showing only the number plates, which are the specific images to be searched for in the input original image shown in FIG. 4 in the present embodiment. In FIG. 5, numeral 51 corresponds to the number plate 41 and numeral 52 corresponds to the number plate 42.

Figure 6:
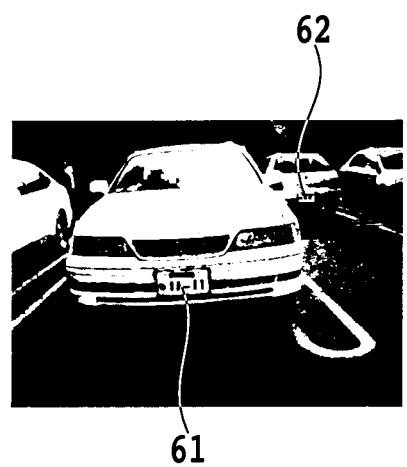
FIG. 6 is a diagram showing an example of reduction processing of an original image in an embodiment of the present invention.

In the present embodiment, the initial value of the scaling factor (enlargement/reduction ratio) is 50% (one half) and therefore, the original image is reduced to 50% thereof in step S202. FIG. 6 is an example of the input original image after the original image is subjected to the reduction processing in step S202 in the present embodiment. In FIG. 6, numeral 61 denotes a number plate corresponding to the number plate 41 after the reduction processing and numeral 62 denotes a number plate corresponding to the number plate 42 after the reduction processing.

In step S203, the CPU 101 carries out the detection processing of a specific image to be searched for (here, number plate). This detection processing may use a publicly known method for detecting a character block or method for detecting a specific pattern or mark. In addition, a white connected area may be detected as a number plate area, when the outer shape of the white connected area is a rectangle or a trapezoid and also numbers or characters exist within the area. That is, the CPU 101 detects the number plate (specific image) from the image, the size of which has been changed (enlarged or reduced) in step S202 according to the currently set scaling factor (enlargement/reduction ratio).

In step S204, the CPU 101 carries out the processing to determine whether a specific image to be searched for has been detected in step S203.

It is assumed that the size which can be detected by one detection process (detectable dot range for the horizontal direction length of the number plate area) is between 100 dots and 200 dots in the image detection device according to the present embodiment. In the original image after the reduction processing shown in FIG. 6, the number plate of a size between 100 dots and 200 dots is assumed to be only the number plate 61. In this case, the number plate 61 is detected as a specific image to be searched for. When the specific image to be searched for is detected, the process goes to step S205.

Note that there is no limit to the number of number plates to be detected and any number of number plates can be detected provided the sizes thereof fall in the above detectable size range (here, between 100 dots and 200 dots).

Note that, when the number plate is detected in step S204, the CPU 101 carries out the recognition processing of the characters within the number plate for the detected number plate. For this recognition method, the conventional OCR processing may be used. The CPU 101 stores the recognized characters in the memory 102. The characters of this recognition result can be utilized in another application or the like afterward.

When it is determined that a specific image to be searched for is not detected in step S204, the process goes to step S208.

When it is determined that a specific image (number plate) to be searched for is detected in step S204, the CPU 101 calculates, in step S205, an area in which another specific image cannot exist (absent area) such as a part where the specific image to be searched for exists and the periphery thereof.

In the simplest embodiment, the area where the found specific image to be searched for exists may be calculated as the absent area. For example, when the specific image to be searched for is the number plate, the simplest example of the above-described absent area may be a rectangular area where the number plate exists. While a case in which complex calculation processing is involved is described in a second embodiment, this calculation method depends on the kind of a specific image to be searched for.

Further, when the specific image is the number plate, the car body thereof is frequently photographed in the periphery of the number plate and the possibility that another number plate is photographed there is considered to be low. Accordingly, a twice large area around the rectangular area of the detected number plate, for example, may be set as the area (absent area) where another number plate does not exist. The CPU 101 stores coordinate information in the image of the calculated absent area and the current scaling factor (enlargement/reduction ratio) in the memory 102 in association with each other.

Note that, in the present description, the "absent area" is an area where another specific image to be searched for cannot exist and which includes at least the specific image to be searched for detected in step S203. Since the absent area includes the area where the specific image to be searched for has been detected and the area where the specific image is considered not to exist, the part corresponding to the absent area is omitted from the detection processing object in the next detection step. Thereby, it is possible to reduce the calculation amount of the detection processing and to improve the processing speed. That is, the CPU 101 determines the absent area on the basis of the detected specific image and carries out control so as to exclude the absent area from the detection processing object of the specific image to be searched for, in the following step S207.

In step S206, the CPU 101 carries out processing to determine whether or not the sum total of the calculated absent areas accounts for a percentage larger than or equal to a predetermined percentage (a predetermined threshold value) of the original image by comparing the sum total of the absent areas calculated in step S205 with the original image. This determination is made by comparing, for example, the area of the calculated absent areas with the area of the original image and determining whether the area percentage of the sum total of the image parts corresponding to the absent areas exceeds 80% to the original image. Although varying depending on the kind of a specific image to be searched for, the value is determined by a criterion whether the possibility that another specific image to be searched for exists is high or not. When the total area of the calculated absent areas is larger than the area of the original image, that is, when it is considered that another specific image to be searched for can not exist, the entire processing is exited and the specific image detection operation is ended.

Here, at the time of the above comparison, the CPU 101 calculates the area of the original image. Simultaneously with this operation, the CPU 101 calculates the area of each of the absent areas calculated so far, sums the calculated areas, calculates the percentage of the sum total area to the above-described original image area, and calculates whether or not the percentage is larger than or equal to the predetermined percentage (here, 80%). In the present embodiment, at the time of the absent area calculation in step S205, the coordinate information in the image of the calculated absent area and the enlargement/reduction ratio at the time of calculation are stored in the memory 102. Consequently, the CPU 101 may read the information from the memory 102, convert the scale of the absent area into the scale of the original image from the coordinate information according to the scaling factor at the time of acquisition thereof for each of the absent areas, and compare the percentage of the areas.

In such processing, the CPU 101 can determine whether or not another specific image to be searched for can exist in the original image. For example, when the total area percentage occupying the original image of the image part corresponding to the absent area (including the case that the number of the calculated absent areas is one) is 90% and exceeds the predetermined percentage (80%), it is possible to determine that another number plate cannot exist.

In addition, it is possible to determine the lower limit value of the above predetermined percentage (here, 80%) according to the specifications of the image detection device or the property of the photograph to be shot. That is, it is possible to determine the lower limit value in the size of the original image in consideration of the size that the image detection device can detect. Conversely, the case that there is a specific image to be searched for the size of which is so small that the image detection device cannot detect in the size of the original image is determined to be the case that the specific image to be searched for cannot exist. Further, in the case that the original image (photograph) is considered to be shot including a landscape around a car body carrying the number plate which is desired to be the detection processing object, if the absent area exceeds 80%, the remaining area is considered to be the landscape and the detection processing may be ended. Here, the absent area is an area including the car number plate and the car body, for example.

On the other hand, the CPU 101 determines that another specific image to be searched for can exist when the total area percentage occupying the original image of the image part corresponding to the absent area is smaller than a predetermined percentage, and the process goes to the next step.

In the case that the calculated area is still small, that is, one or more specific images to be searched for can exist, the CPU 101, in step S207, paints out the part of the original image corresponding to the absent area calculated in step S205 using a predetermined color.

Figure 7:
FIG. 7 is a diagram showing an example of an area painted out in black by processing to paint out the area in an embodiment of the present invention.

For example, when the number plate area having the white ground is detected in step S203, the determination whether the detected white-pixels connected area indicates the number plate area or not is carried out as follows. That is, by the black paint-out of the part corresponding to the absent area, the absent area is excluded from the detection processing object of the number plate area. FIG. 7 is a diagram showing an example of the original image in which the absent area is painted out in black in step S207 after the absent area calculation processing in step S205 is carried out by use of the specific image information detected in FIG. 6. In this manner, when the number plate is detected by use of the white pixel in the ground, since the white pixel for the criterion exists no more in the absent area by the black paint-out, it is possible to efficiently exclude the absent area from the object of the number plate detection.

Figure 8:
FIG. 8 is a diagram showing an example of an area painted out in white by processing to paint out the area in an embodiment of the present invention.

Further, in the case that the number plate area is detected by use of a black pixel of the number or character described on the number plate in the detection processing of step S203, the processing is carried out as follows. That is, by the white paint-out of the part corresponding to the absent area, the absent area is excluded from the number plate detection processing object. FIG. 8 is a diagram showing an example of the original image in which the absent area is painted out in white in step S207 after the absent area calculation processing in step S205 is carried out by use of the specific image information detected in FIG. 6. In this manner, when the specific image to be searched for is detected by use of the black pixel, since the black pixel for the criterion exists no more in the absent area by the white paint-out, it is possible to efficiently exclude the absent area from the detection object.

In this manner, painting out whether in white or black depends on the detection processing in step S203. Further, while the present embodiment excludes the absent area from the next detection processing object by the paint-out processing, the present embodiment is not limited to this method. For example, by retaining the coordinate information of the absent area in the memory without carrying out the paint-out processing, the CPU 101 may have a configuration to exclude the absent area from the detection object according to the coordinate information at the time of detection processing in step S203.

In step S208, the CPU 101 carries out the change processing (update processing) of the current scaling factor (enlargement/reduction ratio). The present embodiment changes the scaling factor such that the size of the image of the detection processing object becomes larger than that of the previous (past) image. The rate of the change depends on the precision of the detection processing in step S203, although varying depending on the specific image to be searched for. That is, it depends on the size the image detection device can detect. The CPU 101 stores the updated enlargement/reduction ratio in the memory 102.

For example, the change of the scaling factor in S208 is carried out so as to enlarge the image according to a criterion shown below. By changing the enlargement/reduction ratio in this manner, it is possible to carry out the recognition processing sequentially from a small number plate without omission.

When the enlargement/reduction processing is carried out, the scaling factor value should be changed such that no size is omitted for the specific image which can be detected at this detection precision. For example, when it is possible to detect the specific image of a size between 100 dots and 200 dots in the detection processing of step S203, the scaling factor may be changed so as to increase by two times sequentially from the initial scaling factor. For example, in the case that the initial scaling factor is one fourth, the scaling factor may be changed sequentially to one half and then to one. Further, when the detectable size is between 200 dots and 300 dots, the enlargement/reduction processing is carried out with the scaling factor increased by one and a half sequentially from the initial scaling factor. Note that the scaling factor change method is not limited to the above example, and the scaling factor may be changed more finely in consideration of an error or detection precision in the size change.

Note that, when the detection speed is prioritized, this does not apply.

In step S209, the CPU 101 carries out processing to determine whether the scaling factor (enlargement/reduction ratio) determined by the processing in step S208 is within a criterion range. That is, the CPU 101 determines whether or not the above-described updated scaling factor stored in the memory 102 exceeds a predetermined threshold value (e.g. 200% (two times)). Note that it is obvious that when the scaling factor is 100%, the size is the same as that of the original image. That is, the scaling factor is a percentage when the original image is taken as a base, and a percentage indicating the amount of enlargement or reduction provided to the original image.

When the scaling factor does not exceed 100%, the CPU 101 returns to step S202 and repeats the processing. When it exceeds, the CPU 101 ends the specific image detection operation. In this manner, the CPU 101 is designed to determine whether or not another specific image to be searched for can exist in the original image. At this time, the CPU 101 repeats steps S202 to S209 until it determines that another specific image to be searched for cannot exist.

Further, in step S209, when the scaling factor satisfies a certain condition in a case such as one that the above-described updated scaling factor (enlargement/reduction ratio) exceeds 200% (threshold value), and also no number plate is detected, the CPU 101 determines that no number plate exists in the original image.

The criterion used in this step S209 is assumed to be determined depending on the kind of the specific image to be searched for and the image size detectable in the detection processing in step S203.

In the present embodiment, the criterion to end the detection processing in step S209 is that the image enlarged by the updated enlargement/reduction ratio exceeds 200%, however, the criterion is not limited to this criterion. For example, the above-described specific image detection operation may be ended in step S209 when the number of updates in the scaling factor (enlargement/reduction ratio) exceeds a threshold value. Further, the above-described specific image detection operation may be ended when the image the size of which is changed by the updated scaling factor enlargement/reduction ratio) exceeds a predetermined size (predetermined umber of dots).

Note that, in the present embodiment, whether or not another specific image to be searched for can exist in the original image is determined in step S209 as described above. Here, in an actual case, a number plate the size of which is smaller than the detectable size of the device, may exist without being detected. However, the present embodiment treats the number plate of such a small size as the image which is not the object of the number plate recognition processing because of the small size. In order to detect even such a small-sized number plate, the threshold value in step S209 may be set to, for example, 400% although it depends on the user's desire.

Further, in step S201, if an initial set value of the scaling factor set in step S201 is reduced, a number plate photographed in a large size within the original image is allowed to fall within the detectable size range of the device by the initial reduction. As a result, it is possible to detect even a larger number plate in the original image.

As described above, in the present embodiment, the scaling factor (enlargement/reduction ratio) is initially set depending on a use case of the user or the size of an object such that the original image gets to have a predetermined size, and the detection processing is carried out in the image with an enlarged or reduced size obtained by enlargement or reduction of the original image according to the initial setting. Consequently, it is possible to detect the specific image to be searched for of a size desired by the user without fail.

Next, whether or not another specific image to be searched for can exist in the original image is determined and, when it is determined that it can exist, the detection processing of the specific image to be searched for is carried out again for the image, scaling factor for which has been changed. That is, the control is carried out such that the specific images to be searched for of various sizes included in the original image fall within the detectable size range of the image detection device, and it is possible to detect the specific images to be searched for of various sizes in the original image.

Second Embodiment

In a second embodiment, there will be described a case in which a number plate is supposed to be an example of a specific image to be searched for.

Also in the second embodiment, the flowchart showing the operation of the entire system of the invention shown in FIG. 2 remains unchanged, exactly the same as that described in the first embodiment.

Figure 9:
FIG. 9 is a diagram showing an example of an image of a photographed number plate in an input original image in an embodiment of the present invention.

FIG. 9 is a diagram showing an example of a photographed image of the number plate, which is an input image in the present embodiment. There is a possibility that a plurality of number plates of different sizes may exist and the number plate is not necessarily photographed from the front.

Figure 10:
FIG. 10 is a diagram showing an example of a number plate area when a car body is photographed from the left in an embodiment of the present invention.

FIG. 10 is a diagram showing an example of a cutout of the number plate area which is detected in step S203 in the present embodiment. When the car body is photographed obliquely from the left, such a trapezoidal shape rectangular area is obtained.

Figure 11:
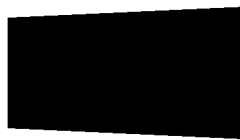
FIG. 11 is a diagram showing an example of a number plate area when a car body is photographed from the right in an embodiment of the present invention.

FIG. 11 is a diagram showing an example of a cutout of the number plate area which is detected in step S203 in the present embodiment. When the car body is photographed obliquely from right, such a trapezoidal shape rectangular area is obtained.

Figure 12:
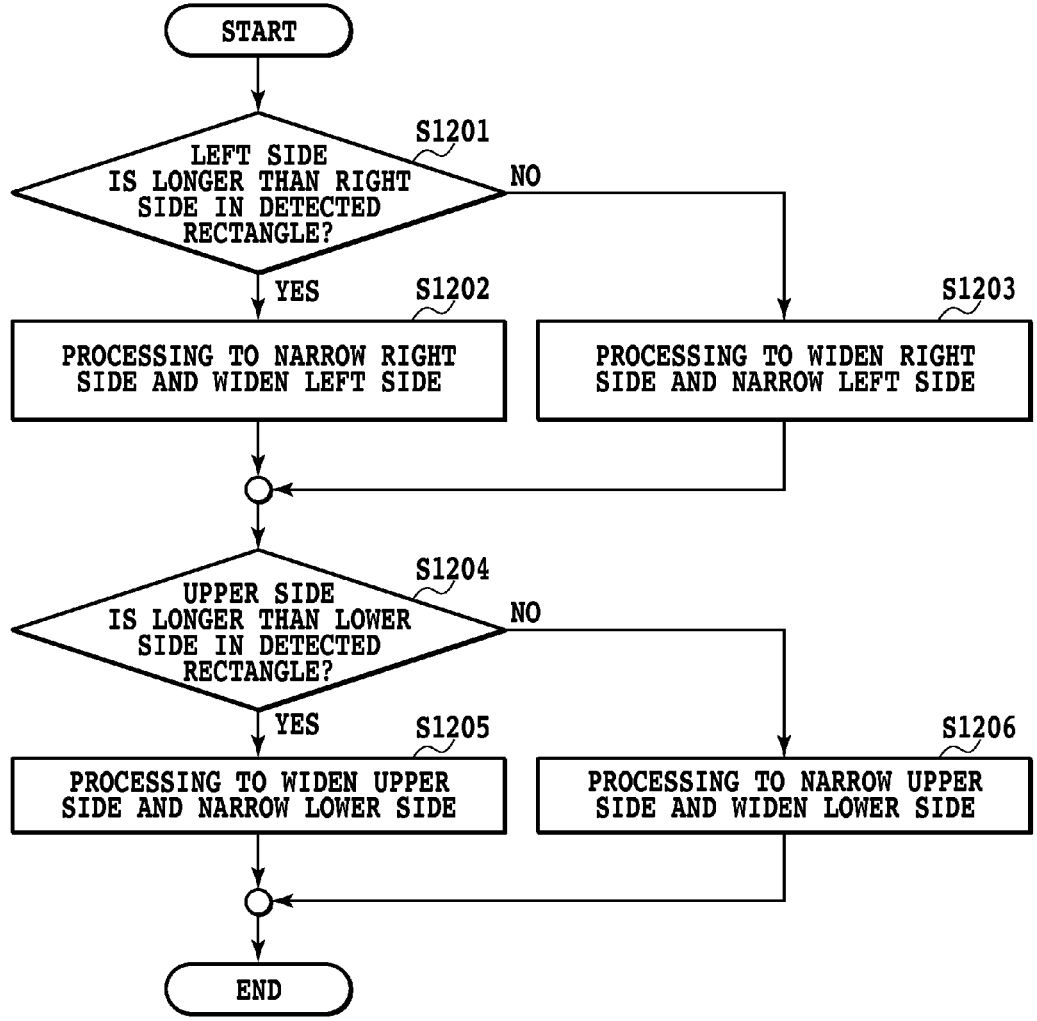
FIG. 12 is a flowchart showing details of absent area calculation processing in an embodiment of the present invention.

FIG. 12 is a flowchart showing detailed absent area calculation processing of step S205 in the second embodiment of the present invention. The CPU 101 reads a program stored in the memory 102 and executes the following operations according to the flowchart shown in FIG. 12.

In step S1201, the CPU 101 carries out the processing to compare and determine the lengths of the left and right sides in a specific image to be searched for detected in step S203 (here, rectangle information of the number plate).

When the left side is longer than the right side, the CPU 101 calculates in step S1202 such that the right area becomes narrow and the left area becomes wide at the time of calculating an absent area in which another number plate cannot exist located around the detected number plate area. When the right side is longer than the left side, the CPU 101 calculates in step S1203 such that the left area becomes narrow and the right area becomes wide at the time of calculating an absent area in which another number plate cannot exist located around the detected number plate area.

As can be seen from reference to FIG. 9, this is because of the property that the image is detected from a large specific image and the fact that the number plate is attached to the front or rear of the car body, in the present embodiment. Specifically, it is unlikely that the number plates exist side by side in contact with each other, and therefore, it is assumed that another number plate does not exist in a surrounding area twice as large as the area where the number plate has been found. Then, the surrounding area twice as large as the area is adjusted so as to get to have a size according to the average of the lengths of the right and left sides and the ratios of the respective lengths in the right and left sides.

In step S1204, the CPU 101 now carries out the processing to compare and determine the lengths of the lower side and the upper side from the detected rectangle information as in step S1201.

When the upper side is longer than the lower side, the CPU 101 calculates in step S1204 such that the lower area becomes narrow and the upper area becomes wide according to the ratios of the lengths at the time of calculating an absent area where another number plate cannot exist located around the detected number plate area. When the lower side is longer than the upper side, the CPU 101 calculates in step S1205 such that the upper area becomes narrow and the lower area becomes wide at the time of calculating an absent area where another number plate cannot exist located around the detected number plate area.

Note that another numerical value may be allotted to the basic area where another number plate is assumed not to exist or to the parameter for the adjustment, depending on the condition determined for photographing. For example, in the case that the car bodies are photographed only in the horizontal direction without supposing a multistory parking garage, the car bodies are not overlapped in the vertical direction and another number plate cannot exist over or under the detected number plate. Accordingly, the calculation of the absent area in the vertical direction can be extended to the entire original image.

Third Embodiment

In the present invention, it is preferable that all the specific images to be searched for in the original image can be detected for all the sizes, but there is a case in which a user wants to detect only specific images to be searched for of a specific size a user desires and another size in the vicinity thereof.

Consequently, in the present embodiment, a user specifies the size of a specific image the user wants to detect, and only images of the size and sizes in the vicinity thereof are detected.

Figure 13:
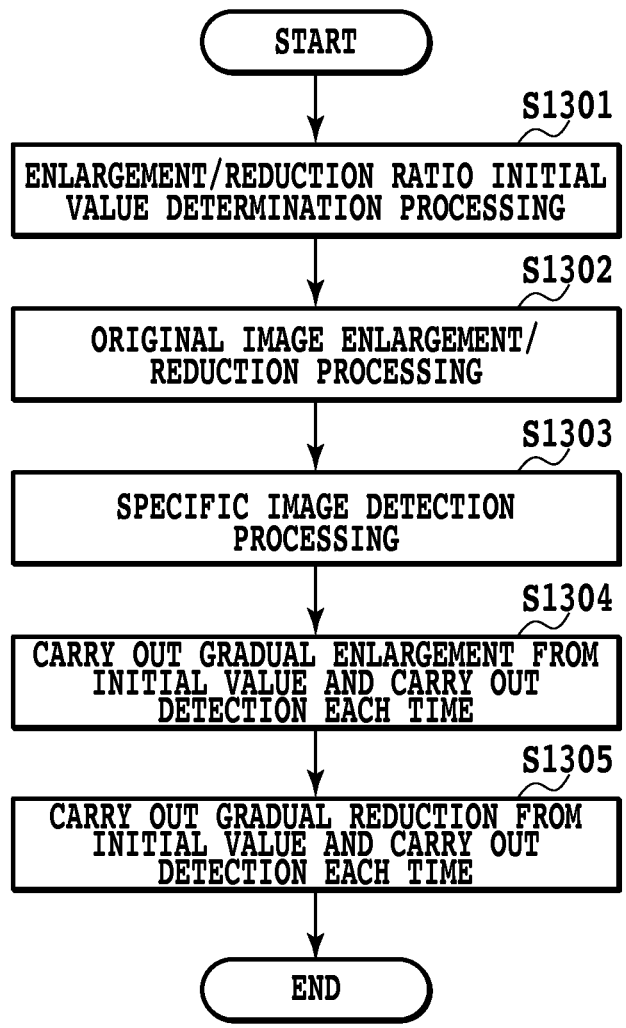
FIG. 13 is a flowchart showing the operation of the entire system in an embodiment of the present invention.

FIG. 13 is a flowchart showing the operation of the entire system in the present embodiment. The CPU 101 reads a program stored in the memory 102 and carries out the following operations according to the flowchart shown in FIG. 13.

In the present embodiment, there will be described a case in which a specific image to be searched for (detection image area) is a number plate, as in the first embodiment.

In step S1301, the CPU 101 carries out the processing to determine a scaling factor (enlargement/reduction ratio) when the size of the input original image is changed initially. At this time, a user inputs information about the size of the number plate to be searched for via the input device 105. The CPU 101 determines an initial value of the enlargement/reduction ratio according to the input information such that the size desired by the user falls within a range of size which the device can detect.

In step S1302, the CPU 101 carries out the size change processing of the original image according to the scaling factor (enlargement/reduction ratio) obtained in step S1301 in the same way as that in step S202.

In step S1303, the CPU 101 carries out the detection processing of the number plate in the same way as that in step S203.

In step S1304, the CPU 101 gradually enlarges the image enlarged or reduced according to the initial setting and detects the number plate at each stage of the enlargement. When the number plate is detected, the CPU 101 stores characters recognized from the detected number plate in the memory 102.

Specifically, as an example, the CPU 101 increases the initial value of the enlargement/reduction ratio step by step by a predetermined ratio (for example, 5%) and ends step S1304 when the number of times of the enlargement processing reaches a predetermined number of times.

In step S1305, the CPU 101 gradually reduces the image enlarged or reduced according to the initial setting and detects the number plate at each stage of reduction. When the number plate is detected, the CPU 101 stores the characters recognized from the detected number plate in the memory 102.

Specifically, as an example, the CPU 101 decreases the initial value of the enlargement/reduction ratio step by step by a predetermined ratio (for example, 5%) and ends step S1305 when the number of times of the reduction processing reaches a predetermined number of times.

Other Embodiments

The present invention can be applied to a system configured with a plurality of devices (e.g. computer, interface device, reader, printer, etc.) and also to a device configured with a single device (multi-functional machine, printer, facsimile device, etc.).

A method of making a storage medium store the program which operates the configuration of the above-described embodiments so as to realize the functions of the above-described embodiments, reading the program stored in the storage medium as a code, and causing a computer to execute the program also falls within the scope of the above-described embodiments. That is, the computer-readable storage medium is also included in the scope of the embodiments. In addition, the computer program itself also falls within the scope of the above-described embodiments as well as the storage medium that stores the above-described computer program.

For the storage medium, it is possible to use a floppy (registered trademark) disk, hard disk, optical disk, magneto-optical disk, CD-ROM, magnetic tape, nonvolatile memory card, and ROM, for example.

Not limited to the configuration that the program alone stored in the above-described storage medium executes the processing, configurations in which a program running on an OS executes the operations in the above-described embodiments in conjunction with other software and the functions of an extension board also fall within the scope of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-244101, filed Sep. 20, 2007, and the Japanese Patent Application is hereby incorporated by reference herein in its entirety.

What is claimed is:

1. An image detection device detecting a specific image to be searched for from an image, the device comprising:
    a size changing means for changing a size of an original image according to a set scaling factor;
    a detection means for detecting the specific image to be searched for within a detectable size range of the image detection device from the image, the size of which has been changed by the size changing means;
    means for determining an absent area where another specific image cannot exist on the basis of the detected specific image, when the specific image to be searched for is detected by the detection means,
    a change means for changing the scaling factor; and
    a control means for performing control so as to make the processing by the size changing means and the processing by the detection means to be carried out again using the scaling factor changed by the change means, wherein the control means excludes a part corresponding to the absent area from an object to be detected by the detection means, when making the processing by the size changing means and the processing by the detection means to be carried out again using the changed scaling factor.

2. The image detection device according to claim 1, wherein the control means
   determines whether another specific image which is not the specific image having been detected by the detection means can exist or not within the original image,
   when determining that another specific image can exist, performs the control so as to make the processing by the size changing means and the processing by the detection means to be carried out again using the scaling factor changed by the change means, and
   when determining that another specific image can not exist, performs the control so as not to make the processing by the size changing means and the processing by the detection means to be carried out again.

3. The image detection device according to claim 2, further comprising
   means for determining an absent area where another specific image cannot exist on the basis of the detected specific image, when the specific image to be searched for is detected by the detection means,
   wherein the control means
      judges whether a ratio of a sum total of the calculated absent area to the original image is larger than a predetermined ratio, and
   when judging that the ratio is smaller than the predetermined ratio, determines that the another specific image can exist, and performs the control so as to make the processing by the size changing means and the processing by the detection means to be carried out again using the scaling factor changed by the change means.

4. The image detection device according to claim 3, wherein the control means, when judging that the absent area has the ratio larger than the predetermined ratio, determines that the another specific image does not exist, and performs the control so as not to make the processing by the size changing means and the processing by the detection means to be carried out again.

5. The image detection device according to claim 2, wherein the control means, when judging that the scaling factor after changed by the change means exceeds a predetermined criterion, determines that the another specific image does not exist, and performs the control so as not to make the processing by the size changing means and the processing by the detection means to be carried out again.

6. The image detection device according to claim 5, wherein the control means determines that the specific image to be searched for does not exist within the original image, when it judges that the scaling factor after changed by the change means exceeds the predetermined criterion and also none of the specific image to be searched for has not been detected.

7. The image detection device according to claim 1, wherein the control means excludes the part corresponding to the absent area in the original image from the object to be detected by the detection means by painting out an image part corresponding to the absent area in a predetermined color.

8. The image detection device according to claim 1, wherein the control means retains coordinate information of an image part corresponding to the absent area in the original image in a memory and excludes the part corresponding to the absent area from the object to be detected by the detection means according to the coordinate information.

9. The image detection device according to claim 1, wherein the means for determining the absent area determines the absent area according to a shape of the detected specific image.

10. The image detection device according to claim 1, further comprising means for setting an initial value of the scaling factor.

11. The image detection device according to claim 1, wherein the change means changes the scaling factor into a scaling factor larger than a previous one.

12. The image detection device according to claim 1, wherein the specific image to be searched for is a number plate.

13. An image detection method detecting a specific image to be searched for from an image, the method comprising the steps of:
   changing a size of an original image according to a set scaling factor;
   detecting the specific image to be searched for from the image, the size of which has been changed by the size changing step;
   determining an absent area where another specific image cannot exist on the basis of the detected specific image, when the specific image to be searched for is detected in the detecting step,
   changing the scaling factor; and
   performing control so as to make the size changing step and the detecting step to be carried out again using the scaling factor changed by the changing step,
   wherein the step of performing control includes excluding a part corresponding to the absent area from an object to be detected in the detecting step, when making the processing in the size changing step and the processing in the detecting step to be carried out again using the changed scaling factor.

14. The image detection method according to claim 13, wherein the step of performing control
   includes determining whether another specific image which is not the specific image having been detected in the detecting step can exist or not within the original image,
   when determining that another specific image can exist, includes performing the control so as to make the size changing step and the detecting step to be carried out again using the scaling factor changed in the changing step, and
   when determining that another specific image can not exist, includes performing the control so as not to make the size changing step and the detecting step to be carried out again.

15. A non-transitory computer-readable storage medium, storing a computer program therein for causing a computer to execute the method according to claim 13.

16. An image detection device detecting a specific image to be searched for from an image, the device comprising:
   a size changing means for changing a size of an original image according to a set scaling factor;
   a detection means for detecting the specific image to be searched for within a detectable size range of the image detection device from the image, the size of which has been changed by the size changing means;
   means for determining a peripheral area of the detected specific image as an absent area where another specific image cannot exist;
   a change means for changing the scaling factor; and a control means for performing control so as to make the processing by the size changing means and the processing by the detection means to be carried out again using the scaling factor changed by the change means, wherein the control means excludes a part corresponding to the absent area from an object to be detected by the detection means, when making the processing by the size changing means and the processing by the detection means to be carried out again using the changed scaling factor.

17. The image detection device according to claim 16, wherein the control means, when judging that the scaling factor after changed by the change means exceeds a predetermined criterion, determines that the another specific image does not exist, and performs the control so as not to make the processing by the size changing means and the processing by the detection means to be carried out again.

18. The image detection device according to claim 16, wherein the control means excludes the part corresponding to the absent area in the original image from the object to be detected by the detection means by painting out an image part corresponding to the absent area in a predetermined color.

19. The image detection device according to claim 16, wherein the control means retains coordinate information of an image part corresponding to the absent area in the original image in a memory and excludes the part corresponding to the absent area from the object to be detected by the detection means according to the coordinate information.

20. The image detection device according to claim 16, wherein the means for determining the absent area determines the absent area according to a shape of the detected specific image.

21. An image detection method detecting a specific image to be searched for from an image, the method comprising the steps of:

changing a size of an original image according to a set scaling factor;

detecting the specific image to be searched for within a detectable size range of the image detection device from the image, the size of which has been changed by the size changing step;

determining a peripheral area of the detected specific image as an absent area where another specific image cannot exist;

changing the scaling factor; and performing control so as to make the size changing step and the detection step to be carried out again using the scaling factor changed by the change step, wherein the step of performing control includes excluding a part corresponding to the absent area from an object to be detected by the detection step, when making the size changing step and the detection step to be carried out again using the changed scaling factor.

22. The image detection method according to claim 21, wherein the step of performing control, when judging that the scaling factor after changed by the change step exceeds a predetermined criterion, includes determining that the another specific image does not exist, and performing the control so as not to make the size changing step and the detection step to be carried out again.

23. The image detection method according to claim 21, wherein the step of performing control includes excluding the part corresponding to the absent area in the original image from the object to be detected by the detection step by painting out an image part corresponding to the absent area in a predetermined color.

24. The image detection method according to claim 21, wherein the step of performing control includes retaining coordinate information of an image part corresponding to the absent area in the original image in a memory and excludes the part corresponding to the absent area from the object to be detected by the detection step according to the coordinate information.

25. The image detection device according to claim 21, wherein the determining step includes determining the absent area according to a shape of the detected specific image.

26. A non-transitory computer-readable storage medium, storing a computer program therein for causing a computer to execute an image detection method detecting a specific image to be searched for from an image, the method comprising the steps of:

changing a size of an original image according to a set scaling factor;

detecting the specific image to be searched for within a detectable size range of the image detection device from the image, the size of which has been changed by the size changing step;

determining a peripheral area of the detected specific image as an absent area where another specific image cannot exist;

changing the scaling factor; and performing control so as to make the size changing step and the detection step to be carried out again using the scaling factor changed by the change step, wherein the step of performing control includes excluding a part corresponding to the absent area from an object to be detected by the detection step, when making the size changing step and the detection step to be carried out again using the changed scaling factor.

27. The non-transitory computer-readable storage medium according to claim 26, wherein the step of performing control, when judging that the scaling factor after changed by the change step exceeds a predetermined criterion, includes determining that the another specific image does not exist, and performing the control so as not to make the size changing step and the detection step to be carried out again.

28. The non-transitory computer-readable storage medium according to claim 26, wherein the step of performing control includes excluding the part corresponding to the absent area in the original image from the object to be detected by the detection step by painting out an image part corresponding to the absent area in a predetermined color.

29. The non-transitory computer-readable storage medium according to claim 26, wherein the step of performing control includes retaining coordinate information of an image part corresponding to the absent area in the original image in a memory and excludes the part corresponding to the absent area from the object to be detected by the detection step according to the coordinate information.

30. The non-transitory computer-readable storage medium according to claim 26, wherein the determining step includes determining the absent area according to a shape of the detected specific image.

31. An image detection device detecting a specific image to be searched for from an image, the device comprising:

a size changing means for changing a size of an original image according to a set scaling factor;

a detection means for detecting the specific image to be searched for within a detectable size range of the image detection device from the image, the size of which has been changed by the size changing means;

a change means for changing the scaling factor; and a control means for performing control so as to make the processing by the size changing means and the processing by the detection means to be carried out again using the scaling factor changed by the change means,
wherein the control means
determines whether another specific image which is not the specific image having been detected by the detection means can exist or not within the original image,
when determining that another specific image can exist, performs the control so as to make the processing by the size changing means and the processing by the detection means to be carried out again using the scaling factor changed by the change means, and
when determining that another specific image can not exist, performs the control so as not to make the processing by the size changing means and the processing by the detection means to be carried out again.

32. An image detection method detecting a specific image to be searched for from an image, the method comprising the steps of:
changing a size of an original image according to a set scaling factor;
detecting the specific image to be searched for within a detectable size range of the image detection device from the image, the size of which has been changed by the size changing step;
changing the scaling factor; and
performing control so as to make the size changing step and the detecting step to be carried out again using the scaling factor changed by the change step,
wherein the step of performing control
includes determining whether another specific image which is not the specific image having been detected by the detection step can exist or not within the original image,
when determining that another specific image can exist, includes performing the control so as to make the size changing step and the detecting step to be carried out again using the scaling factor changed in the changing step, and
when determining that another specific image can not exist, includes performing the control so as not to make the size changing step and the detecting step to be carried out again.

33. A non-transitory computer-readable storage medium, storing a computer program therein for causing a computer to execute an image detection method detecting a specific image to be searched for from an image, the method comprising the steps of:
changing a size of an original image according to a set scaling factor;
detecting the specific image to be searched for within a detectable size range of the image detection device from the image, the size of which has been changed by the size changing step;
changing the scaling factor; and
performing control so as to make the size changing step and the detecting step to be carried out again using the scaling factor changed by the change step,
wherein the step of performing control
determines whether another specific image which is not the specific image having been detected by the detection step can exist or not within the original image,
when determining that another specific image can exist, performs the control so as to make the size changing step and the detecting step to be carried out again using the scaling factor changed in the changing step, and
when determining that another specific image can not exist, performs the control so as not to make the size changing step and the detecting step to be carried out again.

* * * * *